United States Patent [19]

Kato

[11] Patent Number: 4,500,783
[45] Date of Patent: Feb. 19, 1985

[54] NOISE ERASING APPARATUS FOR STIMULABLE PHOSPHOR SHEET

[75] Inventor: Hisatoyo Kato, Minami-ashigara, Japan

[73] Assignee: Fuji Photo Film Co., Ltd., Japan

[21] Appl. No.: 434,884

[22] Filed: Oct. 18, 1982

[30] Foreign Application Priority Data

Oct. 21, 1981 [JP] Japan .................................. 56-168119

[51] Int. Cl.³ .............................................. G03C 5/16
[52] U.S. Cl. ................................................ 250/327.2
[58] Field of Search ............................. 250/327.2, 319

[56] References Cited

U.S. PATENT DOCUMENTS

| | | | |
|---|---|---|---|
| 3,558,308 | 1/1971 | Fletcher | 430/394 |
| 3,776,627 | 12/1973 | Ohnishi et al. | 355/3 R |
| 3,790,784 | 2/1974 | Webb et al. | 250/337 |
| 4,258,264 | 3/1981 | Kotera et al. | 250/484.1 |
| 4,276,473 | 6/1981 | Kato et al. | 250/327.2 |
| 4,340,911 | 7/1982 | Kato et al. | 358/280 |
| 4,387,428 | 6/1983 | Ishida | 364/414 |
| 4,400,619 | 8/1983 | Kotera et al. | 250/327.2 |
| 4,438,333 | 3/1984 | Teraoka et al. | 250/327.2 |
| 4,439,682 | 3/1984 | Matsumoto et al. | 250/327.2 |

FOREIGN PATENT DOCUMENTS

| | | | |
|---|---|---|---|
| 56639 | 7/1982 | European Pat. Off. | 250/319 |
| 56638 | 7/1982 | European Pat. Off. | 250/319 |

Primary Examiner—Janice A. Howell
Assistant Examiner—Constantine Hannaher
Attorney, Agent, or Firm—Gerald J. Ferguson, Jr.; Joseph J. Baker

[57] ABSTRACT

An apparatus for erasing the noise due to the previously stored radiation image and the fog in a stimulable phosphor sheet used for a radiation image recording and reproducing system in which a radiation image is once recorded in the stimulable phosphor sheet and then read out and reproduced on a recording material. The apparatus erases the noise by a single erasing operation when stimulable sheets are taken up one at a time out of their reservoir and each is loaded into a cassette used for the recording of a radiation image. It comprises a high-power light source for erasing the noise, which is provided between the aperture of the reservoir from which the stimulable phosphor sheets are taken up and the section at which the sheets are loaded into the cassettes.

11 Claims, 3 Drawing Figures

NOISE ERASING APPARATUS FOR STIMULABLE PHOSPHOR SHEET

BACKGROUND OF THE INVENTION

1. Field of the Invention

This invention relates to an apparatus for effectively erasing the noise developing in a visible image reproduced from a stimulable phosphor sheet carrying a radiation image. This invention particularly relates to an apparatus for effectively erasing the noise developing in such a reproduced visible image due to repeated use of the stimulable phosphor sheet in a radiation image information recording and reproducing method where the stimulable phosphor sheet is exposed to a radiation to record a radiation image therein and then exposed to a stimulating ray to emit light in the pattern of the stored image, the emitted light is converted to an electric signal, and a visible image corresponding to the radiation image is reproduced by use of the electric signal.

2. Description of the Prior Art

When certain kinds of phosphors are exposed to such radiation as X-rays, $\alpha$-rays, $\beta$-rays, $\gamma$-rays or ultraviolet rays, they store a part of the energy of the radiation. Then, when the phosphor which has been exposed to the radiation is exposed to a stimulating ray such as a visible ray, light is emitted from the phosphor in the pattern of the stored energy of the radiation. A phosphor exhibiting such properties is referred to as a stimulable phosphor.

As disclosed in U.S. Pat. Nos. 4,258,264, 4,276,473 and 4,340,911, U.S. patent application Ser. No. 220,780 (now U.S. Pat. No. 4,387,428) and Japanese unexamined Patent Publication No. 56(1981)-11395, it has been proposed to use the stimulable phosphor for recording a radiation image of an object. Specifically, the stimulable phosphor is first exposed to a radiation to have a radiation image stored therein, and is then scanned with a stimulating ray which causes it to emit light in the pattern of the stored image. The light emitted from the stimulable phosphor upon stimulation thereof is photoelectrically detected and converted to an electric image signal, which is processed as desired to reproduce a visible image of a quality suitable for viewing and diagnostic purposes.

In the radiation image recording and reproducing method described above, the final visible image may be reproduced in the form of a hard copy or may be displayed on a cathoderay tube. The stimulable phosphor sheet used in this method may be in any of various forms such as a panel, drum or the like, which are herein generally referred to as sheets. For economical reasons, it is desirable that the stimulable phosphor sheet be used repeatedly in many separate radiographic operations.

In order to reuse the stimulable phosphor sheet, it is necessary that the stimulable phosphor sheet to be reused be made completely free from the previously stored radiation image. Theoretically, the radiation energy of the radiation image stored in the stimulable phosphor sheet should disappear when the sheet is scanned with a stimulating ray of a sufficient intensity to cause light to emit therefrom in the pattern of the stored radiation image in the course of the radiation image recording and reproducing process as described above. Actually, however, the stored radiation energy cannot be completely eliminated only with the stimulating ray used to scan the stimulable phosphor during the aforesaid process. Thus a part of the previously stored radiation image remains in the reused stimulable phosphor sheet and inconveniently causes noise to occur in the visible image reproduced from the reused stimulable phosphor sheet. In order to successfully reuse the stimulable phosphor sheet, any such residual radiation image thereon must be erased completely before reuse.

Further, a stimulable phosphor contains a little amount of radioactive isotopes such as $^{226}$Ra and $^{40}$K, which emit radiations and cause the stimulable phosphor sheet to store the emitted radiation energy even when the sheet is not being used in exposing to the imagewise radiation. These traces of radioactive isotopes also constitute a cause of the noise developing in the reproduced visible radiation image. Furthermore, a stimulable phosphor sheet is also affected by environmental radiations such as cosmic rays and X-rays emitted from other X-ray sources and stores the energy thereof. These types of radiation energy (hereinafter referred to as fog) undesirably stored in the stimulable phosphor sheet also cause noise to appear in the visible radiation image reproduced from a reused stimulable phosphor sheet and, therefore, must be erased before reusing the stimulable phosphor sheet.

Now, it has been found that, in order to eliminate the detrimental noise due to the residual radiation image, the radiation energy of the radiation image stored in the phosphor must be erased to the order of $10^{-4}$ to $10^{-6}$. Stated differently, the original radiation energy stored in the phosphor must be erased to a level between 0.01 and 0.0001 when the maximum level of the stored radiation energy at the recording of radiation image information is 100. On the other hand, the level of the fog developing in the phosphor is generally about 0.1 to 0.001 based on the maximum of the stored original radiation energy which is taken as 100 as described above. It has also been found that the fog must be erased to a level between about 0.01 and 0.0001 in order to prevent the fog from developing detrimental noise in the next radiographic operation.

Under the above circumstances, in Japanese patent application Nos. 56(1981)-2970 (corresponding to U.S. Pat. No. 4,439,682) and 56(1981)-4889 (corresponding to U.S. Pat. No. 4,438,333) which are applied by same assignee of this invention a noise erasing method and apparatus which comprises two erasing steps wherein the first erasing which requires a long period of time to erase the previously stored image is carried out at an appropriate point of time after the radiation image is stored in a stimulable phosphor and scanned with a stimulating ray, and the second erasing for the fog which can be erased quickly is conduced immediately before the next imagewise exposing to radiation.

However, the above-mentioned system requires two erasing operations using two kinds of separate apparatus for the first and second erasing operations, and therefore is expensive and troublesome.

SUMMARY OF THE INVENTION

The primary object of the present invention is to provide a noise erasing apparatus which can easily erase noise due to the radiation image previously stored and fog in a stimulable phosphor sheet by a single erasing operation.

Another object of the present invention is to provide a noise erasing apparatus which can effectively erase the noise in a stimulable phosphor sheet simultaneously when the stimulable phosphor sheet is loaded into a cassette.

A further object of the present invention is to provide a noise erasing apparatus which can provide a noise-free, sharp radiation image.

The noise erasing apparatus for stimulable phosphor sheets in accordance with the present invention comprises a high-power light irradiation means for emitting noise erasing light provided between a stimulable phosphor sheet outlet of a stimulable phosphor sheet reservoir and a section for loading stimulable phosphor sheets into cassettes in an arrangement wherein stimulable phosphor sheets for use in a radiation image recording and reproducing system are taken up one at a time out of the reservoir and each is loaded into a cassette used for the radiation image recording. The noise erasing apparatus of the present invention can reliably erase the residual radiation image and fog in the stimulable phosphor to a practically acceptable low level by a single erasing operation by use of the irradiating means. Further, the erased stimulable phosphor sheet can be directly supplied to the radiographic apparatus at the next stage or to the radiation image recording and reproducing system as loaded in a cassette. Accordingly, the noise erasing apparatus in accordance with the present invention assures a noise-free sharp radiation image in a simple and reliable manner. Further, the present invention is economically advantageous since noise can be erased by use of a single apparatus.

The exposure amount to be used for erasing the noise varies according to the sensitivity of the stimulable phosphor used. In general, however, it is at least 500,000 lx.sec., preferably from 3,000,000 to 9,000,000 lx.sec., when the previously stored image should be erased to a level between 0.01 and 0.001. The term "exposure amount" as used herein means the illuminance of the erasing light multiplied by the time the stimulable phosphor is exposed to the erasing light.

Of course, the power of the light source and the time during which the stimulable phosphor is exposed thereto may be selected freely, provided that an exposure amount within the aforesaid range is secured.

For instance, in the case of a 356 mm × 432 mm stimulable phosphor sheet, the aforesaid preferable range of exposure, i.e. from 3,000,000 to 9,000,000 lx.sec., can be achieved by exposing the stimulable phosphor sheet to a 10 kW lamp for at least 7.5 seconds and to a 20 kW lamp for at most 10 seconds. The exposure amount of 500,000 lx.sec. which is the minimum necessary value for erasing the noise can be achieved by exposing the stimulable phosphor sheet to a 10 kW lamp for 1.3 seconds.

Usually, it is desirable that the stimulable phosphor sheet be used in radiography within 8 hours, preferably within 6 hours, after it has been exposed to the erasing light by use of the erasing apparatus of the present invention and loaded into the cassette. This is because fog will develop in the stimulable phosphor if it is allowed to stand for a long period after being loaded into the cassette as described above.

DESCRIPTION OF THE PREFERRED EMBODIMENTS

The present invention will hereinbelow be described in further detail with reference to the accompanying drawings.

Figure 1:
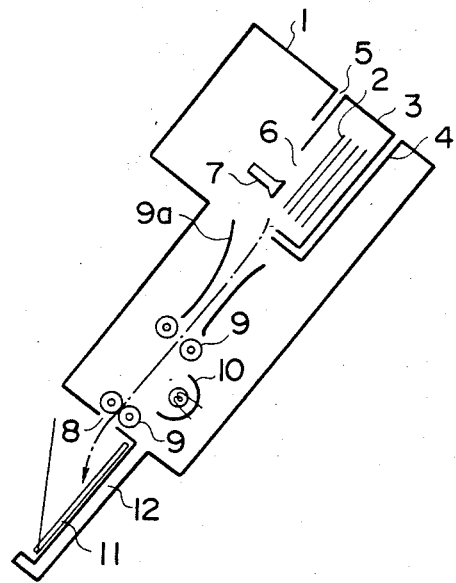
FIGS. 1, 2 and 3 are schematic views respectively showing arrangements for loading a stimulable phosphor sheet into a cassette in which various embodiments of the noise erasing apparatus according to the present invention are employed.

Referring to FIG. 1 showing an arrangement for loading a stimulable phosphor sheet into a cassette in which one embodiment in accordance with the present invention is employed, a body 1 of the arrangement has a magazine fitting section 4 which releasably holds a magazine 3 serving as a sheet reservoir capable of accommodating a plurality of stimulable phosphor sheets 2. In this embodiment, the magazine 3 is inserted into the magazine fitting section 4 through an inlet 5 in the body 1. At the upper section of the magazine fitting section 4 is provided a take-up arm 7 which employs suction to take up the stimulable phosphor sheets 2 one by one from an aperture 6 in the magazine 3 fitted to the magazine fitting section 4. At a section lower than the magazine fitting section 4 are positioned guide plates 9a which receive the sheet 2 taken up by the take-up arm 7 and guide it to two sets of sheet carrying rollers 9 for carrying it up to a sheet outlet 8. An illuminant 10 is positioned between the two sets of sheet carrying rollers 9 so that the sheet 2 can be exposed thereto. Further, a cassette fitting section 12 for releasably holding a cassette 11 capable of accommodating one stimulable phosphor sheet for recording a radiation image is located at a position lower than the sheet outlet 8 and outside the body 1.

The stimulable phosphor sheets 2 stored in the magazine 3 are sucked and taken up one at a time by the take-up arm 7. The illuminant 10 is synchronized with the movement of the stimulable phosphor sheet 2 so that it emits light when the forward end of the taken-up sheet 2 reaches the carrying rollers 9. The sheet 2 is exposed to light when it is passed over the illuminant 10 at a predetermined speed by the carrying rollers 9. At this time, the light irradiation power for the stimulable phosphor sheet is set at 500,000 lx.sec. or more, preferably from 3,000,000 to 9,000,000 lx.sec. After being exposed to light emitted from the illuminant 10, the sheet 2 is ejected from the outlet 8 of body 1 and loaded into the cassette 11. In this embodiment of the present invention, the sheet 2 is passed over the illuminant 10 at a predetermined speed, so that the whole surface thereof is uniformly exposed to light emitted from the illuminant 10. The rotation speed of the carrying rollers 9 is controlled with respect to the light irradiation power of the illuminant 10 so as to secure an exposure amount within the aforesaid range.

In the above-described embodiment, the cassette fitting section 12 is positioned outside the body 1. However, it may be built into the body 1. The illuminant 10 may for example be a tungsten-filament, fluorescent, sodium, xenon or iodine lamp, or the like. Further, a belt, a chain or the like may be used to carry the sheet 2 at a predetermined speed, instead of the above-described sheet carrying rollers 9. In addition, the illuminant 10 may be left on continuously.

Figure 2:
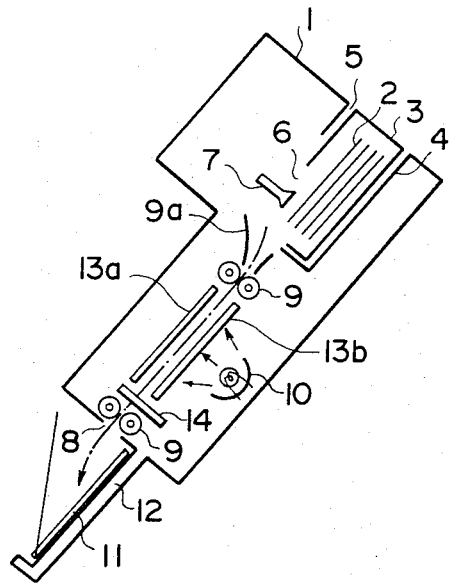

FIG. 2 shows an arrangement for loading a stimulable phosphor sheet into a cassette which employs another embodiment of the present invention. This second embodiment differs from the first described embodiment in that a pair of supporting plates 13a, 13b are used to guide and support the stimulable phosphor sheet 2 (the supporting plate 13b located on the side of the illuminant 10 is transparent), in that a stopper 14 is provided to hold the stimulable phosphor sheet 2 at a predetermined position, and in that the illuminant 10 may be a flashlamp. A plurality of stimulable phosphor sheets 2 contained in the magazine 3 are sucked and taken up one at a time by the take-up arm 7. The taken-up sheet 2 is moved by the carrying rollers 9 and stopped by the stopper 14 with the forward end thereof contacting the stopper 14. In this way, the sheet 2 is supported on the transparent supporting plate 13b positioned on the side nearer to the illuminant 10. In this condition, the sheet 2 is exposed to light emitted from the illuminant 10 through the transparent supporting plate 13b. At this time, the light irradiation power is preferably set at 3,000,000 to 9,000,000 lx. sec. When the irradiation is finished, the stopper 14 is released, and the sheet 2 is ejected from the sheet outlet 8 by the carrying rollers 9 and loaded into the cassette. In this second embodiment, the rotation speed of the sheet carrying rollers 9 need not necessarily be stable nor be controlled according to the power of the illuminant 10. Accordingly, the drive unit for the sheet carrying rollers 9 may be of a simple construction and, consequently, the structure of the whole arrangement can be simplified. Further, it is also possible to omit the carrying rollers 9.

Figure 3:
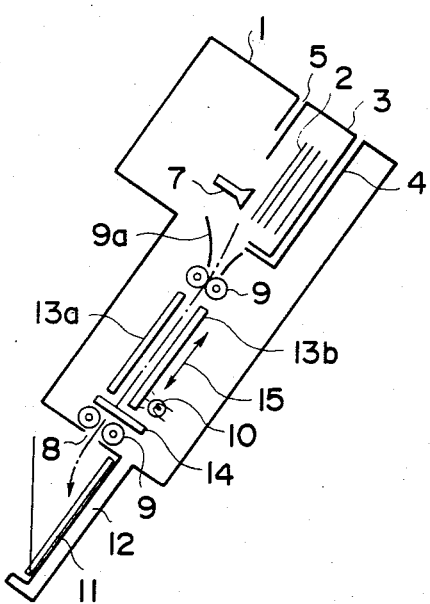

FIG. 3 shows an arrangement for loading a stimulable phosphor sheet into a cassette in which the third embodiment of the present invention is adopted. This third embodiment differs from the above-described second embodiment in that the same type of illuminant 10 as in the first embodiment described above, for instance a tungsten-filament lamp, a fluorescent lamp, sodium lamp, xenon lamp or the like is used, and in that there is used an illuminant moving means (not shown) for moving the illuminant 10 in the direction of arrow 15 along the supporting plate 13b. The sheet 2 is supported on the transparent supporting plate 13b in the same way as in the second embodiment described above. The illuminant 10 moves along the supporting plate 13b at a predetermined speed while light is emitted therefrom. Thus the stimulable phosphor sheet 2 is exposed to light from its forward end up to its tail end. The moving speed of the illuminant 10 must of course be controlled in accordance with the power thereof. After the exposure is finished, the sheet 2 is loaded into the cassette 11 in the same manner as in the second embodiment mentioned above. Also in this third embodiment, the whole surface of the stimulable phosphor sheet 2 can be uniformly exposed to light as in the case of the first embodiment.

In each of the above-described embodiments of the present invention, the suction-type take-up arm 7 is used to take up the stimulable phosphor sheets 2 one by one from the aperture 6 of the magazine 3 fitted to the magazine fitting section 4. However, the take-up arm 7 may of course be replaced by any other suitable type of means having a similar function.

I claim:

1. In an arrangement wherein stimulable phosphor sheets for use in a radiation image recording and reproducing system are taken up one at a time out of a stimulable phosphor sheet reservoir containing stimulable phosphor sheets and each is loaded into a cassette used for the recording of a radiation image, a noise erasing apparatus for stimulable phosphor sheets comprising an irradiation means for emitting noise erasing light, which is provided between the aperture of said stimulable phosphor sheet reservoir from which said stimulable phosphor sheets are taken up and the section at which said stimulable phosphor sheets are loaded into said cassettes, said irradiation means having an exposure amount of 500,000 lx.sec. or more.

2. A noise erasing apparatus for stimulable phosphor sheets as defined in claim 1 wherein said irradiation means has an exposure amount ranging from 3,000,000 to 9,000,000 lx.sec.

3. A noise erasing apparatus for stimulable phosphor sheets as defined in claim 1 further comprising a carrying means for moving said stimulable phosphor sheets past said irradiation means.

4. A noise erasing apparatus for stimulable phosphor sheets as defined in claim 3 further comprising a guiding means for guiding said stimulable phosphor sheets from said aperture of the stimulable phosphor sheet reservoir to said carrying means.

5. A noise erasing apparatus for stimulable phosphor sheets as defined in claim 3 wherein the carrying speed of said carrying means is controlled with respect to the power of said irradiation means.

6. A noise erasing apparatus for stimulable phosphor sheets as defined in claim 1 further comprising a supporting means for guiding and supporting said stimulable phosphor sheets past said irradiation means.

7. A noise erasing apparatus for stimulable phosphor sheets as defined in claim 6 wherein said supporting means consists of a pair of plates one of which is transparent.

8. A noise erasing apparatus for stimulable phosphor sheets as defined in claim 7 wherein said transparent plate of said pair of plates is positioned on the side nearer to said irradiation means than the other.

9. A noise erasing apparatus for stimulable phosphor sheets as defined in claim 6 further comprising a stopper means for holding said stimulable phosphor sheets in a predetermined position as supported by said supporting means.

10. A noise erasing apparatus for stimulable phosphor sheets as defined in claim 6 further comprising a means for moving said irradiation means along said supporting means.

11. A noise erasing apparatus for stimulable phosphor sheets as defined in claim 10 wherein the moving speed of said irradiation means is controlled with respect to the power thereof.

* * * * *